United States Patent
Naganna et al.

(10) Patent No.: US 11,954,193 B2
(45) Date of Patent: Apr. 9, 2024

(54) AUTOMATIC CONFIGURATION SWITCHING IN BIOMETRIC MATCHING

(71) Applicant: International Business Machines Corporation, Armonk, NY (US)

(72) Inventors: Soma Shekar Naganna, Bangalore (IN); Abhishek Seth, Deoband (IN); Neeraj Ramkrishna Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 17/463,850

(22) Filed: Sep. 1, 2021

(65) Prior Publication Data
US 2023/0060524 A1   Mar. 2, 2023

(51) Int. Cl.
G06F 21/32   (2013.01)
(52) U.S. Cl.
CPC .................................. G06F 21/32 (2013.01)
(58) Field of Classification Search
CPC ....................................................... G06F 21/32
USPC ........................................................... 726/19
See application file for complete search history.

(56) References Cited

U.S. PATENT DOCUMENTS

| 7,698,322 | B1 | 4/2010 | Langley |
| 2013/0083975 | A1 | 4/2013 | Partington |
| 2018/0039823 | A1 | 2/2018 | Asati |
| 2018/0232739 | A1* | 8/2018 | Battle ................ G06Q 20/1085 |
| 2019/0141494 | A1 | 5/2019 | Gross |
| 2020/0274877 | A1 | 8/2020 | Kwatra |
| 2020/0304955 | A1 | 9/2020 | Gross |

FOREIGN PATENT DOCUMENTS

| CN | 108135527 A | 6/2018 |
| CN | 112905276 A | 6/2021 |

OTHER PUBLICATIONS

"System and method for enhancing data match & search quality with the amalgamation of biometric and biographic data matching", An IP.com Prior Art Database Technical Disclosure, Authors et. al.: Disclosed Anonymously, IP.com No. IPCOM000260642D, IP.com Electronic Publication Date: Dec. 13, 2019, 6 pages.
Bhatt et al., "Can Combining Demographics and Biometrics Improve De-duplication Performance?", 2013 IEEE Conference on Computer Vision and Pattern Recognition Workshops, DOI 10.1109/CVPRW.2013.35, pp. 188-193.
Liu et al., "Efficient fingerprint search based on database clustering", ScienceDirect, Pattern Recognition 40 (2007) 1793-1803, The Journal of the Pattern Recognition Society, Published by Elsevier Ltd., Nov. 16, 2006, doi:10.1016/j.patcog.2006.11.007.
(Continued)

Primary Examiner — Michael S McNally
(74) Attorney, Agent, or Firm — David B. Woycechowsky (57) ABSTRACT

Computer system for performing biometric matching in a way that balances accuracy level required in the biometric matching against computing resources (for example, processor cycles) that will be needed to match authentication requesters with profiles of authorized users. In some embodiments, this is achieved by controlling the number of clusters and/or the number of clusters to be searched pursuant to an authentication request.

13 Claims, 6 Drawing Sheets

(56) References Cited

OTHER PUBLICATIONS

Scheidat et al., "Parameter Optimization for Biometric Fingerprint Recognition using Genetic Algorithms", MM&Sec'06, Sep. 26-27, 2006, Geneva, Switzerland, 5 pages.
"Notification of Transmittal of the International Search Report and the Written Opinion of the International Searching Authority, or the Declaration", From the International Searching Authority, Applicant's or agent's file reference: PF220601PCT, International application No. PCT/CN2022/114471, International filing date: Aug. 24, 2022, 10 pgs.

* cited by examiner

AUTOMATIC CONFIGURATION SWITCHING IN BIOMETRIC MATCHING

BACKGROUND

The present invention relates generally to the field of biometric matching, and more particularly to match and search parameters and configuration profiles used in biometric matching.

The Wikipedia entry for "Biometrics" (as of Jan. 26, 2021) states as follows: "Biometrics are body measurements and calculations related to human characteristics. Biometrics authentication (or realistic authentication) is used in computer science as a form of identification and access control . . . Biometric identifiers are the distinctive, measurable characteristics used to label and describe individuals. Biometric identifiers are often categorized as physiological versus behavioral characteristics. Physiological characteristics are related to the shape of the body. Examples include, but are not limited to fingerprint, palm veins, face recognition, DNA [Deoxyribonucleic acid], palm print, hand geometry, iris recognition, retina and odor/scent. Behavioral characteristics are related to the pattern of behavior of a person, including but not limited to typing rhythm, gait, keystroke, signature, behavioral profiling, and voice. Some researchers have coined the term behaviometrics to describe the latter class of biometrics. More traditional means of access control include token-based identification systems, such as a driver's license or passport, and knowledge-based identification systems, such as a password or personal identification number. Since biometric identifiers are unique to individuals, they are more reliable in verifying identity than token and knowledge-based methods . . . " (footnote(s) omitted)

US published patent application 2020/0274877 states, in part, as follows: "Embodiments for intelligent cluster learning in an Internet of Things (IoT) computing environment by a processor. One or more interactive actions, engagements, behaviors, communications, biometric data, parameters, or combination thereof relating to one or more IoT devices may be analyzed. A user profile may be clustered into a cluster of profiles according to the one or more interactive actions, engagements, behaviors, communications, biometric data, parameters, or combination thereof using one or more machine learning operations . . . The operations of method 700 may dynamically create the user profile upon detection of the one or more interactive actions, engagements, behaviors, communications, biometric data, parameters, or combination thereof with the one or more IoT devices, and also dynamically create the cluster of profiles according to collected feedback and assigned weights associated with the interactive actions, engagements, behaviors, communications, biometric data, parameters, or combination thereof. The user profile may be assigned to the cluster of the profiles upon a confidence level exceeding a selected threshold. The confidence level may be determined that indicates an accuracy level of the user profile. The conference level of the user profile may increase according to a type of IoT device used by a user, a selected amount of time, or a combination thereof."

SUMMARY

This paragraph will discuss the problem/solution space. The solution space searches and matches on large amounts of biometric data. When it comes to de-duplication (matching) and searching on large volumes of data, it can't be done by iterating over the whole dataset. What is needed is to employ multi-level hierarchical clustering to facilitate faster processing. Since there is always a trade-off between accuracy and computation time, what is needed is an optimal configuration profile for a given desired level of accuracy and computation cost. In that regard, the configuration profile of a biometric matching system consists of: (a) the number of clusters to be created at the first (parent) level, (b) the number of levels in a multi-level hierarchical clustering, (c) the number of clusters to be created at each sub-level, (d) the number of clusters to be searched from a parent/first level during a search transaction, and/or (e) deciding whether to pick one best or top "n" clusters at each sub-level during a search transaction.

According to an aspect of the present invention, there is a method, computer program product and/or system that performs the following operations (not necessarily in the following order): (i) receiving a biometric profiles data set including a plurality of biometric profiles, with each biometric profile including machine readable information indicative of an identity of a given individual person and biometric data that helps to identify the given individual person; (ii) receiving a set of accuracy value(s) indicating a desired level of accuracy in making a determination of an individual's identity using the biometric profiles data set; (iii) receiving a set of computing resource usage maximum value(s) to specify maximum quantity(ies) of computing resource(s) to be used in performing biometric identification using the biometric profiles data set; (iv) receiving a request, from a requestee operating a requestee computing device to perform biometric authentication of the requestee using the biometric profiles data set; and (v) perform the requested biometric authentication of the requestee using the biometric profiles data set to determine that the requestee matches a first biometric profiles of the plurality of biometric profiles, with the performance of the biometric authentication being made: (a) at an accuracy level according to the set of accuracy value(s), and (b) using less computing resources than the specified computing resource maximum value(s).

According to an aspect of the present invention, there is a method, computer program product and/or system that performs the following operations (not necessarily in the following order): (i) receiving a biometric profiles data set including a plurality of biometric profiles, with each biometric profile including machine readable information indicative of an identity of a given individual person and biometric data that helps to identify the given individual person; (ii) receiving a set of accuracy value(s) indicating a desired level of accuracy in making a determination of an individual's identity using the biometric profiles data set; (iii) receiving a request, from a requestee operating a requestee computing device to perform biometric authentication of the requestee using the biometric profiles data set; and (iv) perform the requested biometric authentication of the requestee using the biometric profiles data set to determine that the requestee matches a first biometric profiles of the plurality of biometric profiles, with the performance of the biometric authentication being made at an accuracy level according to the set of accuracy value(s).

According to an aspect of the present invention, there is a method, computer program product and/or system that performs the following operations (not necessarily in the following order): (i) receiving a biometric profiles data set including a plurality of biometric profiles, with each biometric profile including machine readable information indicative of an identity of a given individual person and biometric data that helps to identify the given individual person; (ii) receiving a set of computing resource usage maximum value(s) to specify maximum quantity(ies) of computing resource(s) to be used in performing biometric identification using the biometric profiles data set; (iii) receiving a request, from a requestee operating a requestee computing device to perform biometric authentication of the requestee using the biometric profiles data set; and (iv) perform the requested biometric authentication of the requestee using the biometric profiles data set to determine that the requestee matches a first biometric profiles of the plurality of biometric profiles, with the performance of the biometric authentication being made using less computing resources than the specified computing resource maximum value(s).

DETAILED DESCRIPTION

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
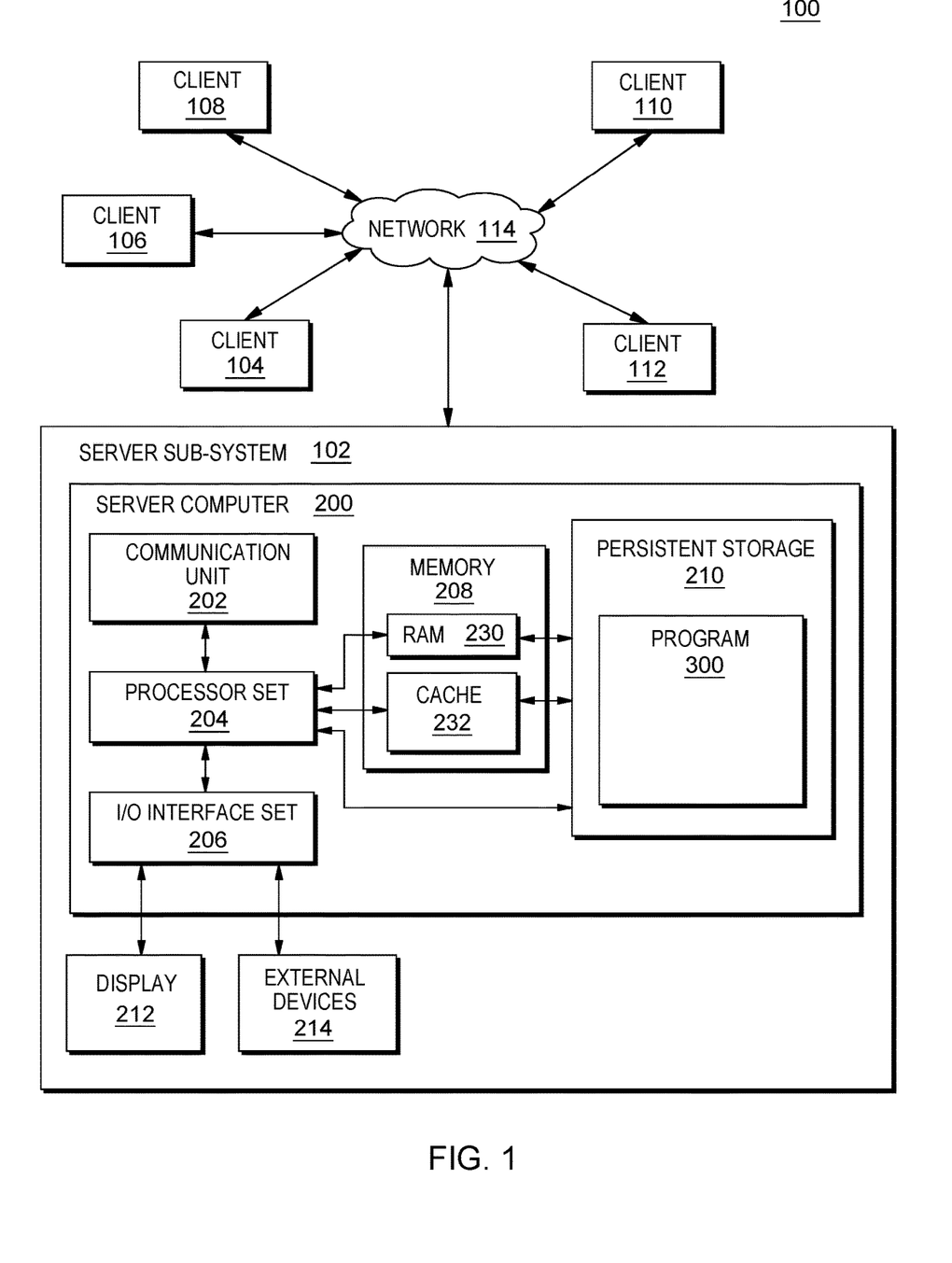
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
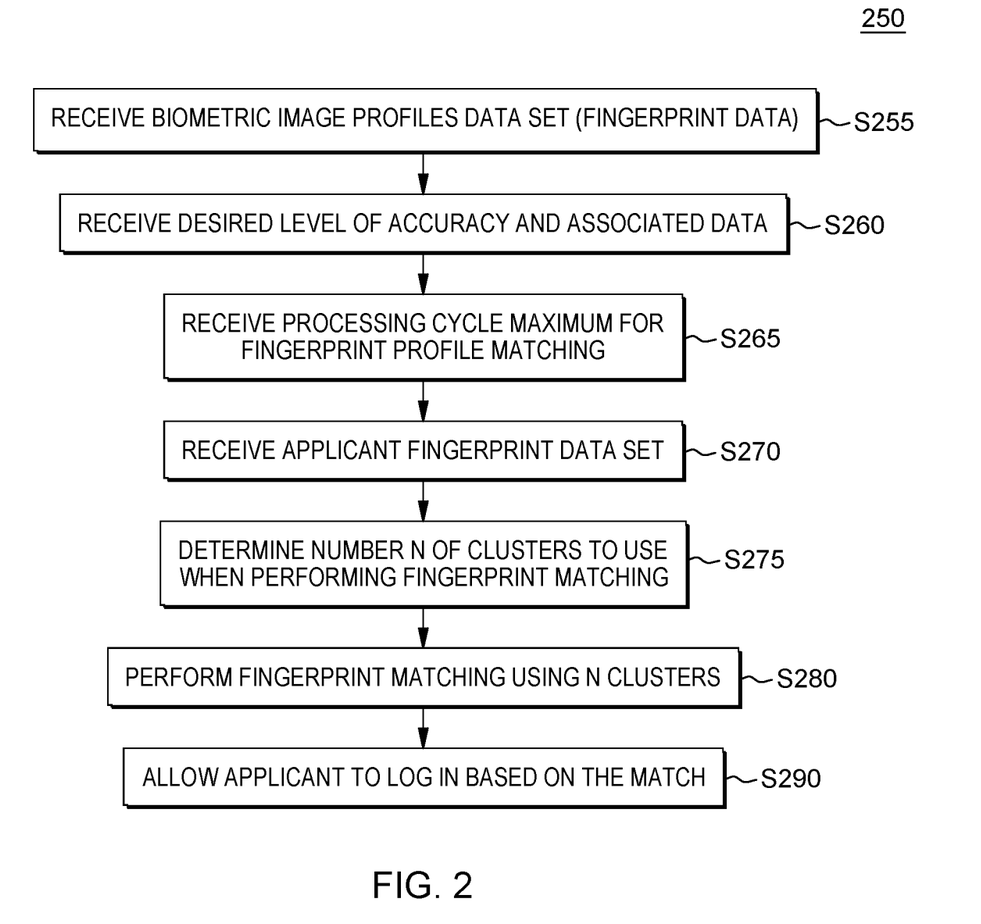
FIG. 2 is a flowchart showing a first embodiment method performed, at least in part, by the first embodiment system.
Figure 3:
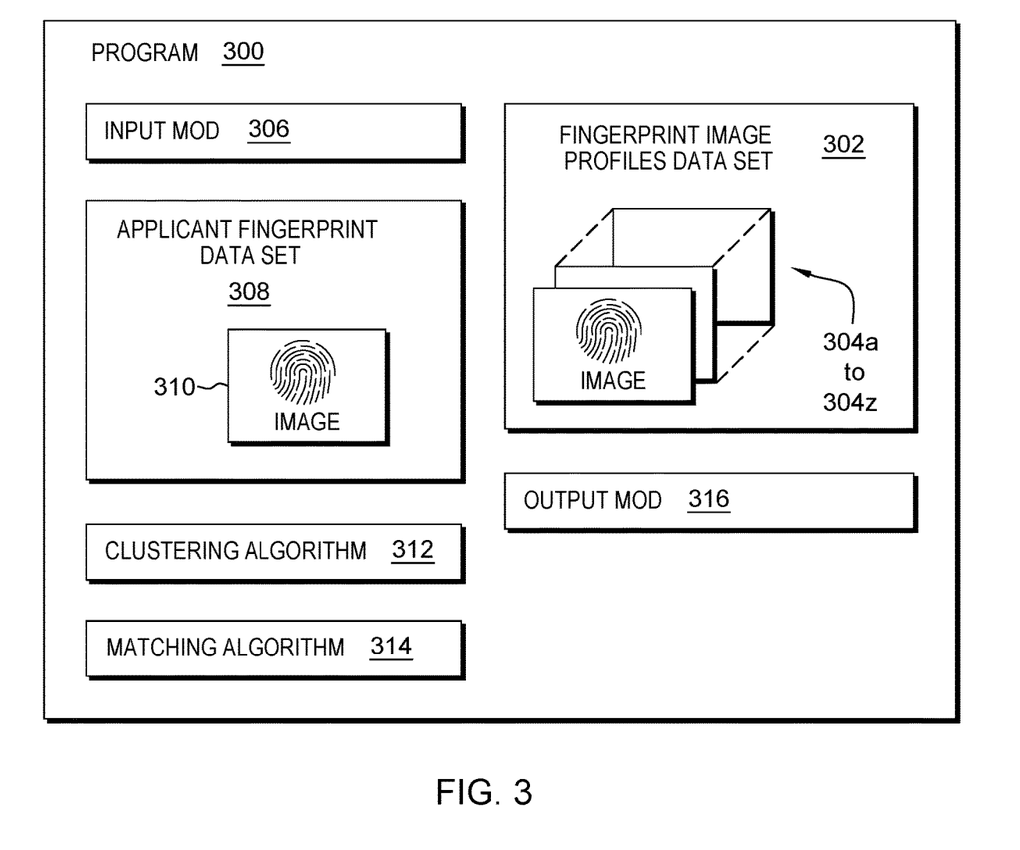
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

As shown in FIG. 2, flow chart 250 shows a method according to the present invention for performing biometric matching at a desired level of accuracy and with a predetermined maximum number of processing cycles. Processing begins at S255, where input module ("mod") 306 receives fingerprint image profiles data set 302, which includes twenty-six profiles 304a to 304z, with each profile including: (i) an image of a set of fingerprints; (ii) the data and time the fingerprints were collected; and (iii) identification info for the person who supplied the fingerprints for the profile. As those of skill in the art will recognize, the profiles may contain different types of biometric data other than fingerprints, but the profiles will typically respectively correspond to human beings with predetermined biometric characteristics. In this example, the profiles are received from client subsystem 104 and through network 114.

Processing proceeds to operation S260, where input mod 306 receives value(s) (numerical or otherwise) indicating a desired level of accuracy in making a determination. In this example: (i) the accuracy value is 99.00%; and (ii) this refers to the accuracy in determining whether a fingerprint provided by a person who wants access to a computer system or resource matches one of the profiles (no more than 1.00% of the time should there be a false positive match and/or a false negative non-match). This accuracy value is low, in this example, because it allows the subsequent computations of this method to be performed in a much less computationally intensive manner, which can be helpful in relatively low security computing environments. In this example, the accuracy value comes from client subsystem 106 and through network 114.

Processing proceeds to operation S265, where input mod 306 receives a processing cycle maximum value to be used in connection with biometric authentication. In this example, the processing cycle maximum value comes from client subsystem 106 and through network 114. In this example, the processing cycle maximum is 18 million.

Processing proceeds to operation S270, where input mod 306 receives an "applicant" fingerprint data set 308 that includes an image 310 of the applicant's fingerprints. The applicant wants to access a protected computer resource (specifically, in this example, data stored on client subsystem 110). In order to be allowed access, the fingerprints of the fingerprint data set must sufficiently match one of the profiles 304a to 304z. In this example, the applicant fingerprint data set is received from client subsystem 108, which is a smartphone belonging to a human user named Jane Doe (not shown in the Figures).

Figure 4:
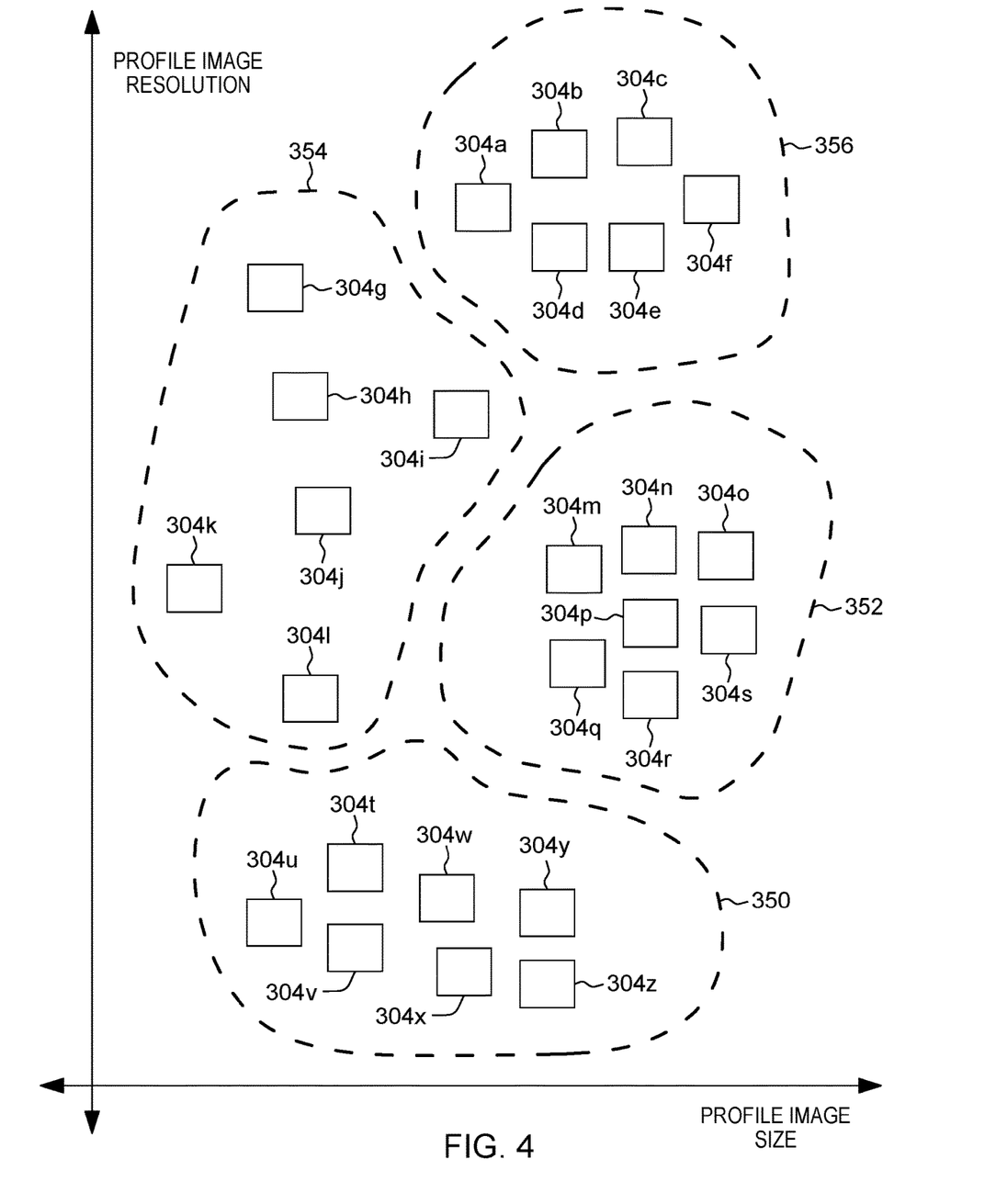
FIG. 4 is a screenshot view generated by the first embodiment system.

Processing proceeds to operation S275, where clustering algorithm 312 determines an integer number N. N is the number of clusters into which the twenty-six (26) recorded profiles 304a to 304z will be divided as part of the biometric matching. This determination is based on the accuracy value (received at operation S260) and the processing cycle maximum value (received at operation S265). In this example, N is calculated to be four (4). As shown in FIG. 4, in this example, the existing profiles are split into four (4) clusters 350, 352, 354, 356, and the clustering is based on only two dimensions for ease of illustration in this pedagogical example. As shown in FIG. 4, these two dimensions are: (i) the profile image resolution (measured in pixels per centimeter); and (ii) the profile image size (measured in kilobytes). More commercially useful embodiments of this invention will generally have more clusters and more dimensions, but these values will still be limited somewhat by the requisite accuracy reflected by the accuracy value and the processing cycle maximum.

Processing proceeds to operation S280, where matching algorithm 314 uses clusters 350, 352, 354 and 356 as a basis for determining that profile 304b is a match for image 310. This matching is performed at the specified accuracy level and within the maximum processing cycle value. At operation S280, it is determined that profile 304b, belonging to one Jane Doe, is a match for image 310.

Processing proceeds to operation S290, where output mod 316 allows Jane Doe to access the protected data on client subsystem 110 because she has been duly authenticated by her biometric data.

III. Further Comments and/or Embodiments

Some embodiments of the present invention recognize the following facts, potential problems and/or potential areas for improvement with respect to the current state of the art: (i) the objective of biometric matching (for example, facial image matching), is used to determine if two or more images are of the same person or "entity" by comparing the images; (ii) in the context of master data management (MDM), image matching requires searching through a large database of images and comparing all the images that look similar; (iii) searches cannot be done by going through all the images available in the database (that is, there is some kind of multi-level clustering required to achieve the scalability in production systems); (iv) search outcomes are driven by: (a) an implementation's required accuracy rate, (b) various configuration parameters of biometric matching, and/or (c) the cost in time or CPU (central processing unit) cycles required to achieve that result; (v) typical MDM customers can spend hours or weeks tuning their biometric configuration parameters to meet their accuracy needs while fitting within their cost profile (either time, money, or both); and/or (vi) current MDM tuning practices are manual, time consuming, and static.

Some embodiments of the present invention may include one, or more, of the following operations, features, characteristics and/or advantages: (i) obtains the optimal match and search configuration parameters based on the desired accuracy and computation cost; (ii) includes auto-switching of different configuration profiles based on cost constraints; and/or (iii) includes the generation of different configuration profiles for search and match in a multi-level clustered biometric matching process based on: (a) the desired accuracy rate, (b) the cloud computation cost, and/or (c) dynamic switching among different profiles.

Figure 5A:
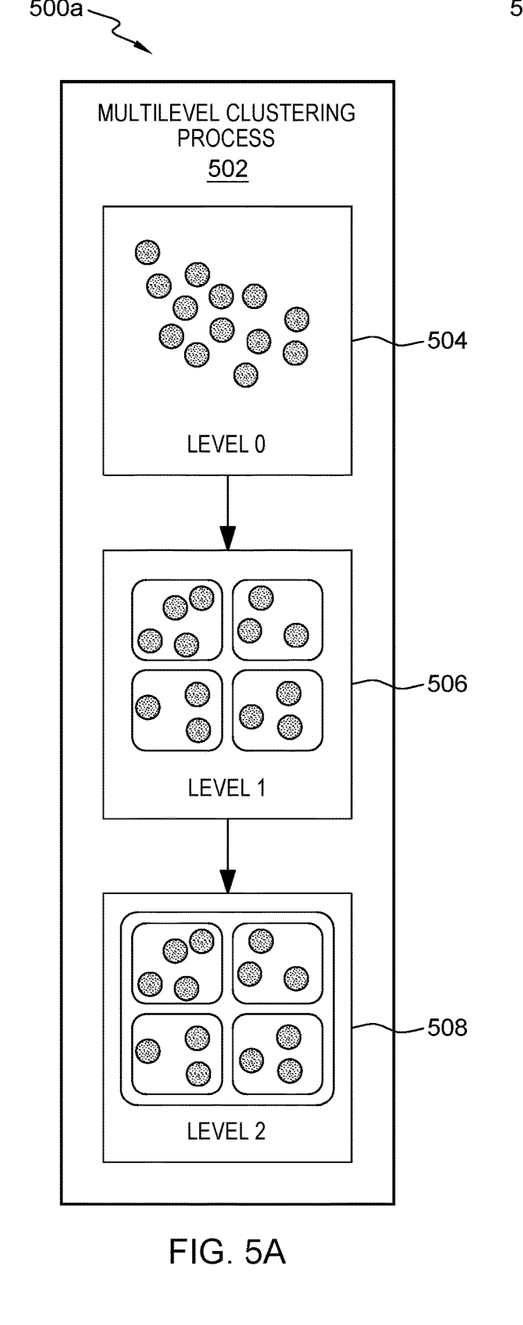
FIG. 5A is a diagram helpful in understanding various embodiments of the present invention.
Figure 5B:
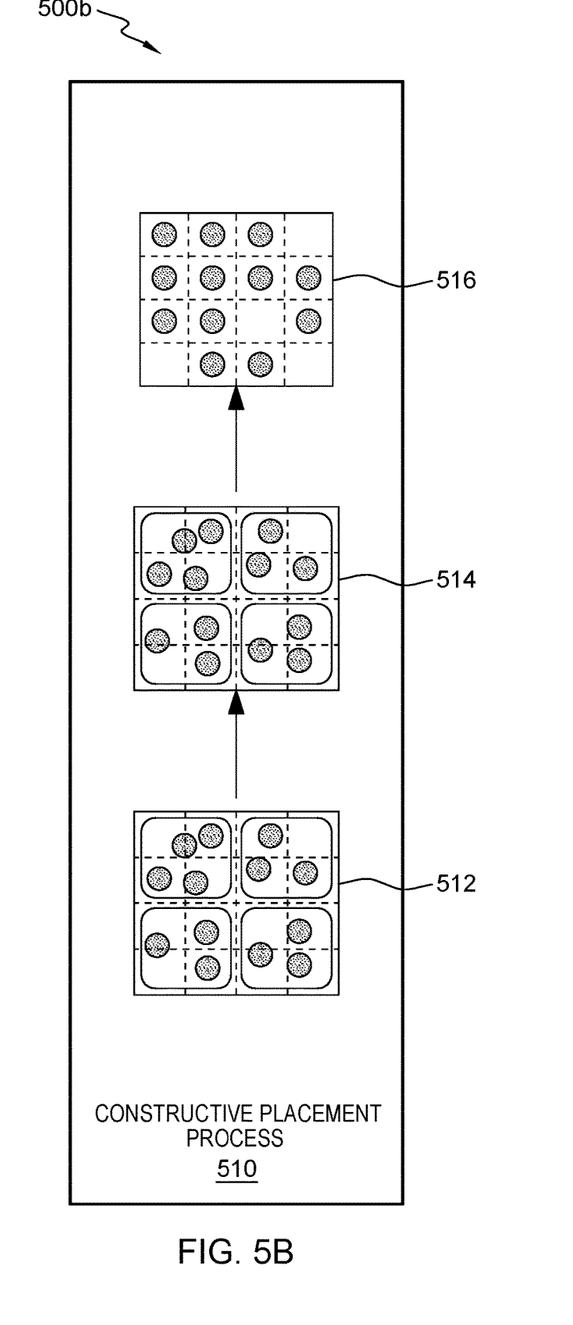
FIG. 5B is a diagram helpful in understanding various embodiments of the present invention.

As shown, FIG. 5A diagram 500a includes: multilevel clustering process block 502; level 0 cluster block 504; level 1 cluster block 506; and level 2 cluster block 508. As shown, FIG. 5B diagram 500b includes: constructive placement process block 510; cluster block 512; cluster block 514; and cluster block 516.

Some embodiments of the present invention may include one, or more, of the following operations, features, characteristics and/or advantages: (i) in multi-level clustering techniques, there are various parameters to be determined (for example, the number of clusters to be created at the top level and each sub-level, and the number of levels of clustering); (ii) during search transactions, there are many configuration parameters which drive the search results (for example, the number of clusters to be searched from the first level and each subsequent levels, and whether to pick the best cluster results or pick some top n cluster results); (iii) allows the user to specify: (a) a level of accuracy for "search" operations by providing test data and the corresponding search results, and/or (b) a target CPU consumption range; (iv) includes a decision engine which can obtain the optimal parameters of multi-level clustering based on the target CPU consumption limit; (v) includes a switching engine which can determine the right set of configuration parameters such that the cost of searching remains within the range; and/or (vi) ensures that any of the desired search results are not missed.

According to some embodiments of the present invention, determination of the number of clusters at each level of clustering is performed. These operations will now be discussed in the following three (3) paragraphs.

Let's assume there are "n" numbers of records which are to be clustered using multi-level clustering. To understand this, focus on determining the number of clusters to be created at one particular level. Given the clustering done at any level, there would be search and add transactions in the system. Generally, there are 80% search and 20% add transactions. As the number of clusters increase at any level, add transactions become costlier while the search transactions become cheaper in terms of time taken/resources consumed. So, the problem reduces to finding an optimal value of the number of clusters to be created such that:

$$0.8*t_{search}+0.2*t_{add}<=t_{allowed} \text{ (related to resource consumption)}$$

The process starts with two (2) clusters for the given data available at that level and keeps on increasing the number of clusters until the inequality in the paragraph above is satisfied. This activity can be done at each level to get the optimal number of clusters at that level, or the results obtained above can be used in relation with data-size to get the number of clusters at each level based on the data-size at that level.

As the number of levels of clustering increases, the time taken for search transactions decreases, but the accuracy level also decreases because of a narrowing down approach. An optimal value needs to be found for the number of levels such that the time taken for search transactions is within the limit, and the accuracy is above the threshold. If after a certain level of clustering, the search time taken is within the limits, but the accuracy is not met, the search is expanded by searching in more clusters available at that level. This has the potential of increasing the accuracy, but the time taken also increases, however not to the same extent.

Figure 6:
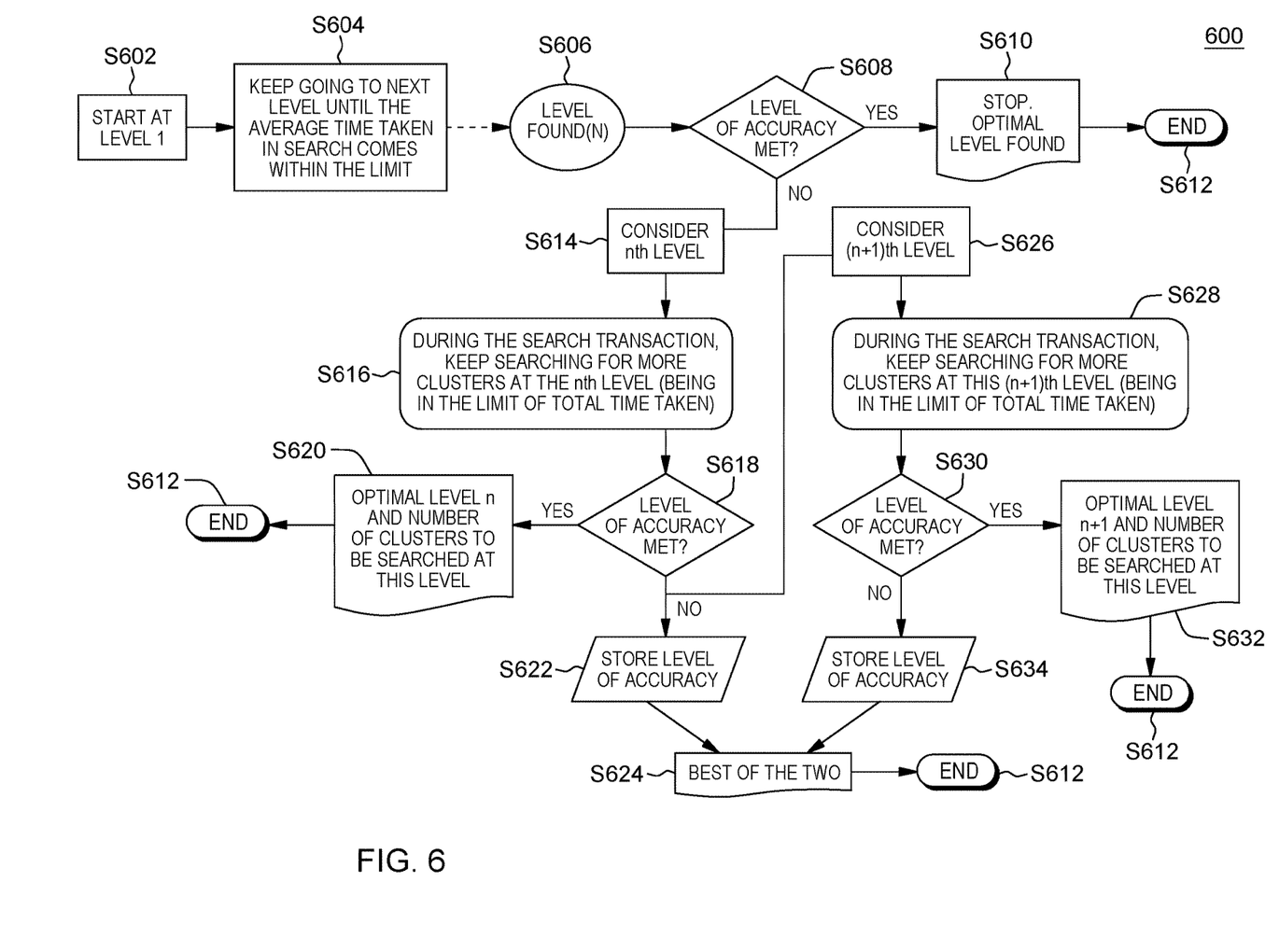
FIG. 6 is a flowchart showing a second embodiment method.

As shown in FIG. 6, flowchart 600 includes: start at level 1 block S602; keep going to next level until the average time taken in search comes within the limit block S604; level found(n) block S606; level of accuracy met decision block S608; stop optimal level found block S610; end block S612; consider nth level block S614; during the search transaction keep searching for more clusters at this nth level (being in the limit of total time taken) block S616; level of accuracy met decision block S618; optimal level n and number of clusters to be searched at this level block S620; store level of accuracy block S622; best of the two block S624; consider (n+1)th level block S626; during the search transaction keep searching for more clusters at this (n+1)th level (being in the limit of total time taken) block S628; level of accuracy met block S630; optimal level n+1 and number of clusters to be searched at this level block S632; and store level of accuracy block S634.

Some embodiments of the present invention may include one, or more, of the following operations, features, characteristics and/or advantages: (i) auto switching of biometric matching configuration profiles is based on: (a) the targeted level of accuracy, and/or (b) the resources available; (ii) generates an optimal set of parameters for biometric matching configuration for: (a) a given search accuracy, and/or (b) the availability of the resources; (iii) includes a configuration decision engine for picking an optimal set of configuration parameters of biometric matching using one or all of the following: (a) an algorithm/approach to arrive at an optimal set of parameters/functions, and/or (b) a ML (machine learning) based approach which incorporates the user's feedback, target search accuracy, and resource availability; and/or (iv) uses dynamic switching of the parameters for biometric search use cases (for example, how many clusters are to be searched for at various levels of multi-level clustering based on the resources available).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
   receiving a biometric profiles data set including a plurality of biometric profiles, with each biometric profile including machine readable information indicative of an identity of a given individual person and biometric data that helps to identify the given individual person;
   receiving a set of accuracy value(s) indicating a desired level of accuracy in making a determination of an individual's identity using the biometric profiles data set;
   receiving a set of computing resource usage maximum value(s) to specify maximum quantity(ies) of computing resource(s) to be used in performing biometric identification using the biometric profiles data set;
   receiving a request, from a requestee operating a requestee computing device to perform biometric authentication of the requestee using the biometric profiles data set; and
   perform the requested biometric authentication of the requestee using the biometric profiles data set to determine that the requestee matches a first biometric profiles of the plurality of biometric profiles, with the performance of the biometric authentication being made: (i) at an accuracy level according to the set of accuracy value(s), and (ii) using less computing resources than the specified computing resource maximum value(s).

2. The CIM of claim 1 further comprising:
   granting access to the requestee for a protected resource based on the requestee match with the first biometric profile, with the protected resource being a physical object and/or a computing resource.

3. The CIM of claim 1 wherein the biometric data in the plurality of biometric profiles includes fingerprint data.

4. The CIM of claim 1 wherein the computing resource maximum value(s) include a maximum processor use value expressed in units of processing cycles.

5. The CIM of claim 1 further comprising:
   computing the set of accuracy value(s); and
   computing the set of computing resource usage maximum value(s);
   wherein the computations of the set of accuracy value(s) and the set of computing resource maximum values reflects an optimal tradeoff as between a desired level of accuracy and computation cost.

6. The CIM of claim 1 further comprising:
   determining a number of levels N for a multi-level hierarchical clustering;
   for each given hierarchical level of the N levels, determining a number of clusters to be created at the given hierarchical level;
   determining a number of clusters M to be searched from a first level during a search transaction;
   wherein the performance of the biometric authentication includes searching only M clusters at the first level.

7. The CIM of claim 6 wherein M is equal to one.

8. The CIM of claim 6 wherein M is greater than one.

9. A computer-implemented method (CIM) comprising:
   receiving a biometric profiles data set including a plurality of biometric profiles, with each biometric profile including machine readable information indicative of an identity of a given individual person and biometric data that helps to identify the given individual person;
   receiving a set of computing resource usage maximum value(s) to specify maximum quantity(ies) of computing resource(s) to be used in performing biometric identification using the biometric profiles data set;
   receiving a request, from a requestee operating a requestee computing device to perform biometric authentication of the requestee using the biometric profiles data set; and
   perform the requested biometric authentication of the requestee using the biometric profiles data set to determine that the requestee matches a first biometric profiles of the plurality of biometric profiles, with the performance of the biometric authentication being made using less computing resources than the specified computing resource maximum value(s).

10. The CIM of claim 9 further comprising:
    granting access to the requestee for a protected resource based on the requestee match with the first biometric profile, with the protected resource being a physical object and/or a computing resource.

11. The CIM of claim 9 wherein the biometric data in the plurality of biometric profiles includes fingerprint data.

12. The CIM of claim 9 wherein the computing resource maximum value(s) include a maximum processor use value expressed in units of processing cycles.

13. The CIM of claim 9 further comprising:
    determining a number of levels N for a multi-level hierarchical clustering;
    for each given hierarchical level of the N levels, determining a number of clusters to be created at the given hierarchical level;

determining a number of clusters M to be searched from a first level during a search transaction;

wherein the performance of the biometric authentication includes searching only M clusters at the first level.

* * * * *